United States Patent [19]

Helander

[11] 3,850,275
[45] Nov. 26, 1974

[54] SPRING CLUTCH WITH AUTOMATIC DISCONNECT FEATURE

[75] Inventor: Elton L. Helander, Guilford, Conn.

[73] Assignee: Helander Products, Inc., Clinton, Conn.

[22] Filed: Dec. 26, 1972

[21] Appl. No.: 318,372

[52] U.S. Cl. ............................... 192/26, 192/81 R
[51] Int. Cl. ............................................ F16d 11/06
[58] Field of Search .................. 192/26, 33 C, 81 R

[56] References Cited
UNITED STATES PATENTS

| | | | |
|---|---|---|---|
| 3,181,669 | 5/1965 | Kunde et al. | 192/81 R |
| 3,465,857 | 9/1969 | Baer | 192/81 R |
| 3,493,088 | 2/1970 | Hoff | 192/81 R |
| 3,726,372 | 4/1973 | Baer et al. | 192/26 |

*Primary Examiner*—Samuel Scott
*Assistant Examiner*—Wesley S. Ratliff, Jr.
*Attorney, Agent, or Firm*—McCormick, Paulding & Huber

[57] ABSTRACT

A spring clutch includes an input drive member, a helical spring of square cross-section tightly wrapped on the drum of said drive member and an output member journalled in a fixed bearing block and including a drum of slightly smaller diameter than the drum of the drive member. The free end of the spring includes a tang which is restrained by a braking collar. When the input shaft is being driven, as by a sprocket, the spring twists helically, contracting to grip the output drum and drive the output shaft at the same speed as the sprocket. The collar is rotatably supported on the fixed bearing block and normally rotates with the output shaft. However, when the input shaft is stopped, the collar slips on the bearing block, the spring being uncontracted. This releases the output shaft and allows the shaft to be manually rotated independently of the input shaft. Another version also includes a single revolution type collar, also normally rotatable with the output and the input members but with a notch for receiving a tang of the spring. Stopping of the collar by an AC solenoid operated bar causes the spring to unwrap from the input hub. The output shaft can then be freely rotated by hand even when the input hub is continually driven.

4 Claims, 4 Drawing Figures

SPRING CLUTCH WITH AUTOMATIC DISCONNECT FEATURE

BACKGROUND OF THE INVENTION

This invention relates generally to spring clutches and in particular to such clutches which permit the independent movement of both the input and output drive members. Typically, this type of spring clutch incorporates an input drive member which may be releasably coupled to an output member by means of a helical spring of square cross-section. This spring is selectively fixed at one end to the input member and is restrained at the other end so that as the input member rotates, the spring helically contracts until it engages the output member, thus coupling the two. Usually, the restraint of the spring is accomplished by connecting the tang of the spring to either a collar locked to the output shaft, or to a collar which can be selectively stopped, as in a single revolution type clutch or in a more complex spring clutch by electromagnetic means as shown in U.S. Pat. No. 3,637,056 issued to Baer in 1972. The present invention utilizes a "braking" collar which normally rotates with the input and output member but which also can allow the output shaft to rotate independently of the input shaft either when the latter is stopped or continuously driven. Such a device therefore permits the manual rotation of the output shaft without affecting the input drive member. This feature is especially useful, for example, where the output shaft is adapted to carry a roll of moving paper or the like and the drive to a machine is shut down to clear a jam up of the paper in the machine.

SUMMARY OF THE INVENTION

This invention resides in a spring clutch which utilizes a frictionally mounted collar to permit the independent rotation of the input and output drive members. This collar normally rotates with the input drive member and is used to restrain the free end of the spring, which spring is mounted on the input drive member. When the input member is rotated, the spring is twisted helically thereby contracting into engagement with the output member coupling the two. However, when the input member is stopped, the collar slips in response to the natural tendency of the spring to expand thereby uncoupling the output member from the input member. In this way, the two drive members may be freely rotated independently of each other. A more complex version permits uncoupling these members even during continuous driving motion of the input hub.

DETAILED DESCRIPTION OF FIRST EMBODIMENT

Figure 1:
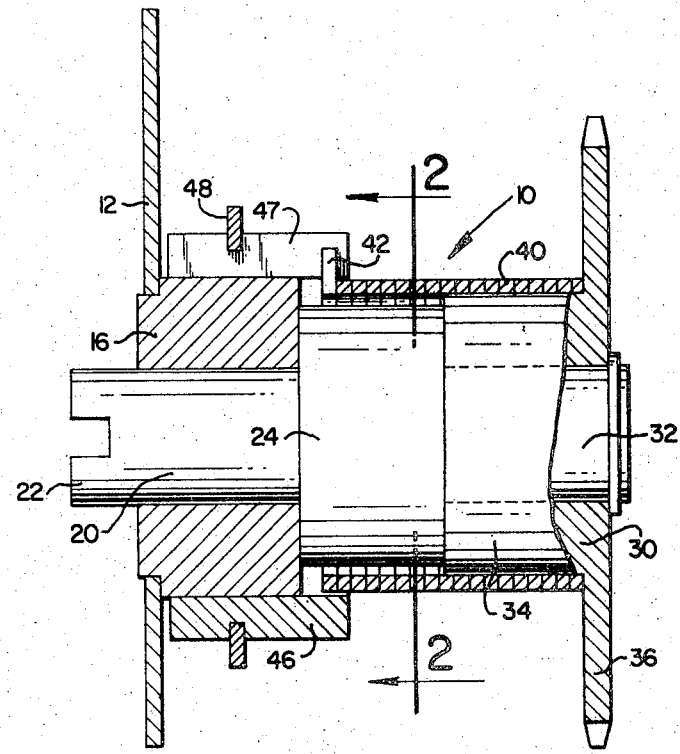
FIG. 1 is a side view partly in cross-section of a spring clutch incorporating the present invention.

Turning now to the drawings and in particular to FIG. 1, a clutch utilizing the present invention is shown generally at 10. The clutch assembly is supported by a bracket 12 which is in turn attached to a frame or other fixed part of a machine or any other suitable mounting surface. The bracket 12 supports a bearing block or fixed drum 16. This bearing block is rigidly mounted and remains in fixed position during the operation of the clutch. Journalled in the bearing block is an output drive member 20. This output drive member comprises a shaft portion 22 and a drum portion 24. Concentric with the output drive member and in axially abutting relationship thereto, is an input drive member shown generally at 30. This input drive member is rotatably mounted on the opposite end 32 of output shaft 22 and comprises a drum portion 34 and a driving portion 36. The driving portion 36 is shown in FIG. 1 as a sprocket but might instead be a gear, or a pulley or the like. As will be noted from FIG. 1, the drum portion 34 of the input drive member 30 is slightly larger in diameter than the diameter of the drum portion 24 of the output drive member 20. It will be noted that this difference is exaggerated in the drawing for clarity. The reason for this difference will soon be made apparent.

Coupled with the input drive member drum portion 34 is a helical spring of square cross-section 40. This spring has one portion tightly wrapped on the drum 34 and is fixed against rotation relative thereto. The spring 40 includes a tang 42 at the end remote from its fixed end which tang is restrained by a slot 47 in the braking collar 46. This collar is slidably mounted for rotation on the bearing block 16 and is preferably fabricated from a material which exhibits a higher coefficient of friction with metal than is the case for the usual spring clutch collar. This material is also preferably resilient enough to be compressed into frictional engagement with the block 16 by a circular spring retaining clip 48. To facilitate this compression of the collar 46, the slot 47 extends the entire axial length of the collar. When the input drive member 30 is rotated, the spring 40 also tends to rotate. However, since the free end of the spring is restrained from rotating by the frictional braking collar 46, the spring is compelled to twist helically. This twisting causes the spring to radially contract, thereby bringing it into engagement with the drum portion 24 of the output drive member 20. The output drive member is thereby coupled to the input drive member and rotates with it. At this point, the collar 46 is likewise induced to rotate by the tang 42 of the now fully contracted spring.

When the input drive member is stopped, the spring 40 tends to expand. The expanded spring will not be wrapped down on the drum portion 24 of the output member, and the latter can be manually rotated with the torque required to do so being merely sufficient to overcome the frictional force between the collar 46 and the bearing block 16. Thus, the collar 46 will slip on the drum of the bearing block. The output drive member may thus be rotated freely in either direction independently of the input drive member whenever the input member is stationary.

The capability of this device to permit the indepenent rotation of the input and output drive members can be especially useful in machinery which carries large rolls of paper or fabric or the like and in which jam ups of this material frequently occur. Where this clutch is utilized, the machine can be shut down and the shafts manually rotated to clear the jam up.

DETAILED DESCRIPTION OF ALTERNATIVE EMBODIMENT

Figure 2:
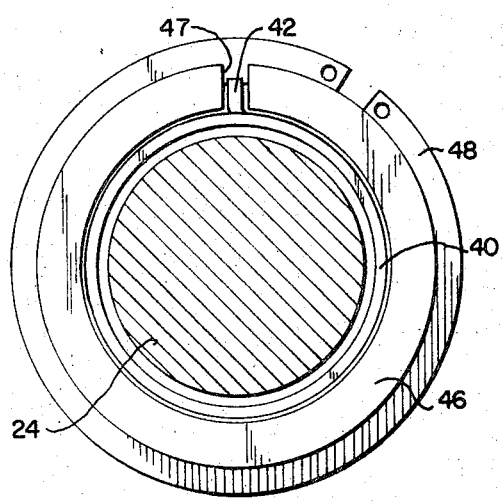
FIG. 2 is a sectional view of the clutch in FIG. 1 taken along the lines 2—2 of FIG. 1.
Figure 3:
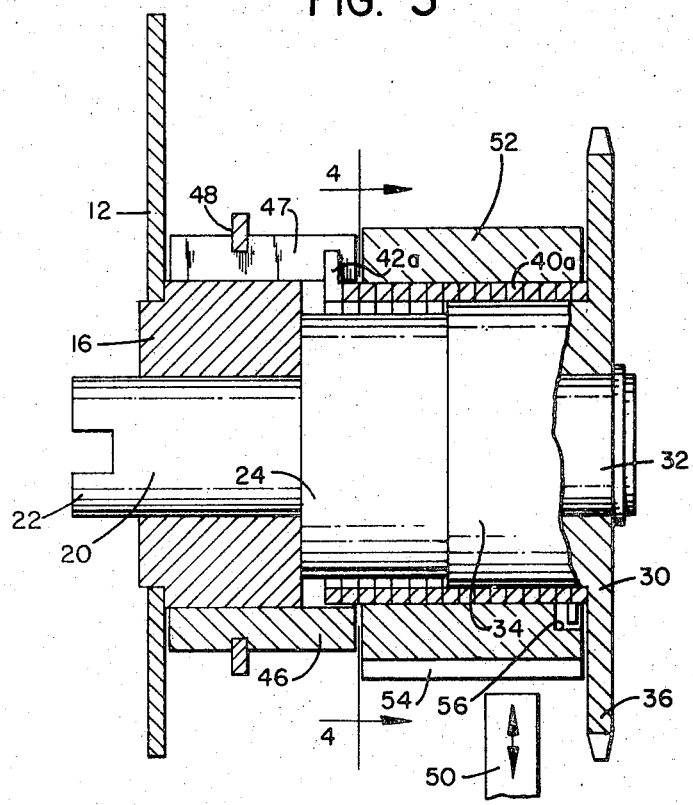
FIG. 3 is a side view partly in section of a first alternative spring clutch construction also incorporating the present invention.
Figure 4:
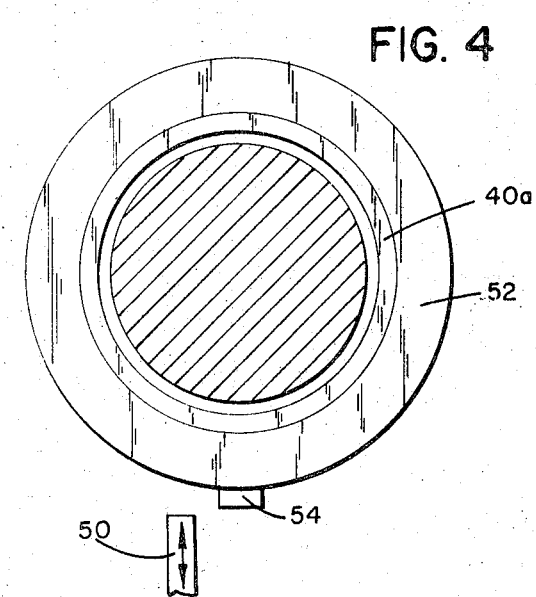
FIG. 4 is a sectional view of the clutch in FIG. 3 taken on line 4—4 of that view.

In the spring clutch shown in FIG. 3, the fixed bearing block 16 is attached to a bracket 12 and rotatably supports an output shaft 22. The output drum 24 is connected to the shaft and they define the output or driven member 20. These and other parts are identical to those parts carrying the same reference numerals shown and described with reference to FIGS. 1 and 2.

The input or drive member 30 is rotatably mounted on the opposite end 32 of the shaft 22, and includes a drum 34 and sprocket 36. The input drum 34 may be slightly larger than the output drum 24, and a spring 40a is wrapped rather tightly on the drum 34 and somewhat more loosely on the drum 24. A braking collar 46 is resiliently held on the fixed drum 16 by a clip 48 and the slot 47 in said collar receives a tang 42a similar in all respects to the tang 42 on the spring 40 of the FIG. 1 clutch. These parts operate in the same manner as their corresponding parts in the first embodiment to permit relative rotational movement of the output shaft 22 when the input sprocket is stopped. However, in the FIG. 3 clutch, this output shaft can also be manipulated while the input sprocket is driven.

To manually manipulate the angular orientation of the output shaft 22, an actuator bar 50 is caused to engage a radially outwardly projecting lug 54 on a collar 52 provided for this purpose in the device.

With the device operating normally, that is with the clutch engaged, and with the friction or split braking collar 46 exerting its retarding influence on the first tang 42a of the spring 40a, the spring is wrapped around both the input and output drums 34 and 24 respectively, causing the output shaft 22 to rotate with the drive sprocket 36.

If the machine operator wants to disengage the clutch as would be the case if he wants to clear some component of the machine of a jam up or the like, he can stop the drive sprocket by turning off the machine or he can merely close a switch, energizing a solenoid to actuate the bar 50 and stop the collar 52 by engagement of the bar 50 with the lug 54. The collar 52 has a recess 56 in which a second tang 41a on spring 40a is received. Thus, stopping the collar 52 also stops the tang 41a and hence causes the spring 40a to unwrap from the input drum 34, thereby disengaging the output hub from the input hub. As a result, even though the sprocket will continue to rotate, output shaft is stopped and can be manually repositioned.

I claim:

1. A helical spring clutch, with automatic disengageable feature when stopped, said clutch comprising:
   a. a fixed block having an outer cylindrical surface and defining a bearing;
   b. a helical clutch spring;
   c. an output member journalled in said bearing and having a cylindrical clutch surface selectively engageable by a portion of said clutch spring;
   d. an input member rotatable concentrically with said output member and engageable by an opposite end portion of said clutch spring;
   e. a collar attached to the end of said clutch spring remote from said input member opposite end portion, said collar fabricated from a material with high frictional or braking characteristics;
   f. said collar having an inner cylindrical surface rotatably mounted on said fixed outer surface of said block, said surfaces normally exerting a braking torque on said remote end of said clutch spring to cause said spring to normally wrap down on said output clutch surface during driving motion of said input member, and said braking surfaces allowing manual relative rotation between said collar and said output clutch surface when said input member is stopped; and
   g. means for urging said inner collar surface into engagement with said fixed block surface.

2. The clutch described in claim 1 wherein said means for urging said collar against said block comprises a retaining ring in an annular groove defined on the external surface of said braking collar, and a slot in said collar to permit the collar to be compressed by said ring.

3. The clutch described in claim 1 wherein a first tang on said remote end of said clutch spring is received in said braking collar, and a stop collar encircling said clutch spring and defining a radially inwardly open slot for receiving a second tang at said opposite end of said clutch spring.

4. The clutch described in claim 3 wherein said stop collar includes a radially outwardly projecting lug adapted for engagement by an actuating bar or the like.

* * * * *